March 8, 1927. 1,619,918
F. BUNEVAC
AUTOMOBILE BODY
Filed May 3, 1926  2 Sheets-Sheet 1
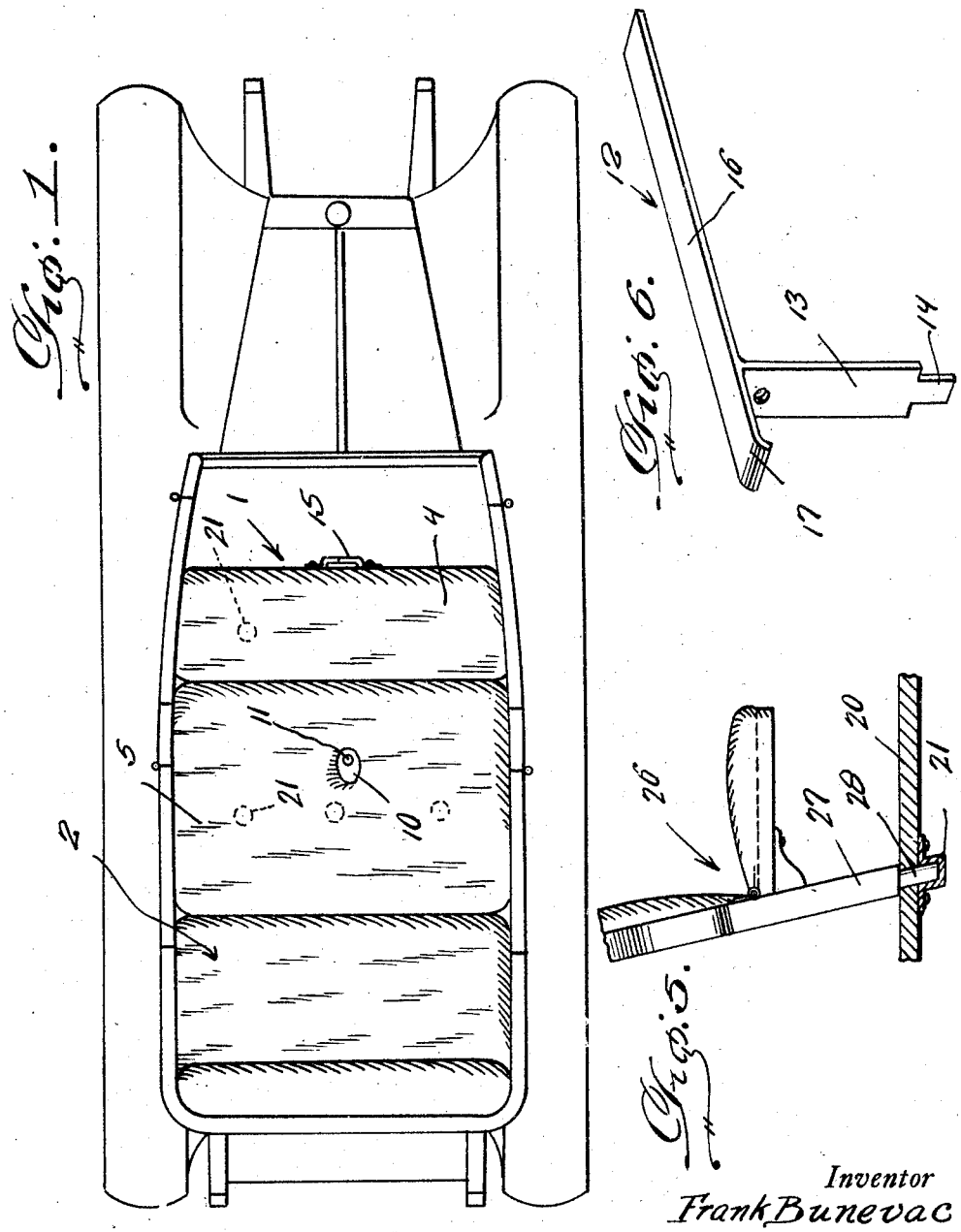
Inventor
Frank Bunevac
By Clarence A. O'Brien
Attorney March 8, 1927.
F. BUNEVAC
AUTOMOBILE BODY
Filed May 3, 1926
1,619,918
2 Sheets-Sheet 2
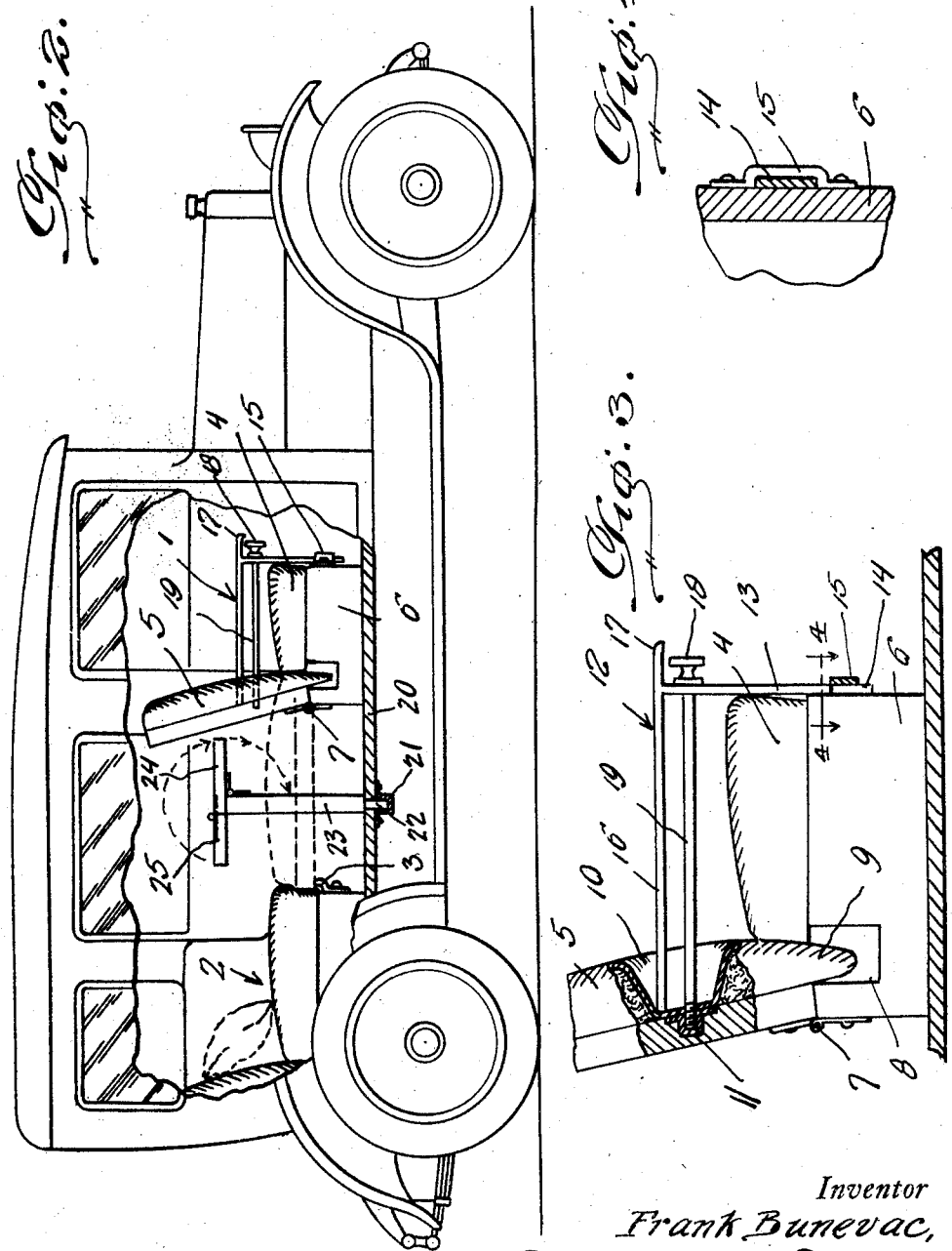
Inventor
Frank Bunevac,
By Clarence A. O'Brien
Attorney ·Patented Mar. 8, 1927.

1,619,918

UNITED STATES PATENT OFFICE.

FRANK BUNEVAC, OF SOUTH BEND, INDIANA.

AUTOMOBILE BODY.

Application filed May 3, 1926. Serial No. 106,415.

This invention relates broadly to improvements in automobile body constructions, and it has more particular reference to a new arrangement of parts in the tonneau of the body for permitting formation of a bed for the occupants by utilizing the seats, or provision of a table and chairs for eating purposes.

Briefly, I provide the front seat with a hingedly mounted back to fit snugly between the front and rear cushions, whereby to permit it to be swung down to a horizontal position in alignment with said cushions to provide a comfortable bed for the occupants.

The outstanding feature of the bed construction is the means which is provided for maintaining the front back rest in an upright position, this means being such as to facilitate downward swinging of the same to bed forming relation with the cushion.

An equally important feature of the eating arrangement is the swivel mounting of the table and chairs, and the compactness and convenience assured by the particular construction thereof and the knock-down construction.

Other features and advantages of the invention will become apparent from the following description and drawings:

In the accompanying drawings forming a part of this application and in which like numerals are employed to designate like parts throughout the same:

Figure 1 is a top plan view of the interior of an automobile body constructed in accordance with this invention.

Figure 2 is a fragmentary side elevation showing the internal construction.

Figure 3 is an enlarged detail elevational and sectional view of one end of the front seat showing the improvements embodied therein.

Figure 4 is an enlarged section taken approximately upon the line 4—4 of Figure 3 looking downwardly.

Figure 5 is a side view of one of the temporary swivel chairs.

Figure 6 is a perspective view of one of the important details of the invention.

Attention is first directed to Figure 2 wherein it will be seen that the reference character 1 designates generally the front seat, and the reference character 2 the rear seat. The rear seat is of customary construction but the base portion is equipped with a stop 3 which serves a purpose to be hereinafter described. The front seat comprises a relatively narrow cushion 4 of appropriate shape and a back rest 5 which is hingedly connected to the base portion 6 as at 7. At this time I would direct attention to Figure 3 wherein it will be seen that the base is provided with a recess 8 in which the lower extended end portion 9 of the back rest extends when the back rest is in seat forming relation with the cushion. It will be noticed that the cushioned portion of the back rest 5 is provided with a pocket 10 and the wooden portion is formed with a screw threaded socket 11 at the bottom of the pocket. An especially constructed retaining device 12 of general right angular form is employed for maintaining the back rest in vertical seat forming position. The depending leg 13 of this retaining device 12 has its lower end 14 reduced and slidably fitted in a keeper bracket 15 carried by the base portion of the seat. The horizontal arm 16 has its free end portion resting in the upper part of the pocket 10. For ornamental purposes, an extension 17 is provided and this overhangs the head 18 of a fastening bolt 19, the screw threaded end of which extends through an opening in the bottom of the pocket end and into the socket 11. Obviously, the manner in which the bolt cooperates with the retaining device 12, and the way in which the extension 9 fits into the recess, permits the hingedly mounted back rest 5 to be maintained in a vertical position or at right angles to the cushion 4.

It is obvious that by loosening the bolt 19 simply rotating it to disconnect the threaded end from the socket 11, and then removing the device 12 to permit the cushion 4 to be slid forward, the extension 9 may be swung up to clear the cushion and back rest 5 moved down to rest upon the stop 3, thus forming a bed of a well known design.

As before stated, when the bed is not in use, I may make use of a temporary table and chair. Therefore, I provide three holes in the bottom 20 of the vehicle and fasten a socket 21 in alignment with these holes as shown in Figure 2 and also in Figure 5. There are three of these sockets, and the central one is adapted to receive the reduced lower end 22 of the standard 23 of a table. In this connection it will be noticed that the main leaf 24 of the table is hinged to the upper end of the standard in a manner so that the inner end portion rests upon the standard. In addition, the auxiliary leaf 25 is hinged to the main leaf 24, and both leaves may be folded together and then swung down beside the standard as indicated, in the arrow formation in Figure 2. By referring to Figure 5 it will be seen that appropriate chairs 26 are provided on opposite sides of the table and the leg 27 of the chair is provided with a reduced lower end 28 fitting into the complemental socket 21. This provides for swivel and detachable mounting of the chair and also the table. As indicated in Figure 1, a socket may be formed underneath of the cushion of the front seat if desired, to accommodate the table when it is not desired to support the table in a crowded condition between the chairs.

It is believed that by considering the description in connection with the drawings, persons familiar with devices of this kind will be able to obtain a clear understanding of the same. Therefore, a more lengthy description is thought unnecessary.

While the preferred embodiment of the invention has been shown and described, it is to be understood that minor changes coming within the field of invention claimed may be resorted to if desired.

Having thus described the invention, what I claim as new and desire to secure by Letters Patent is:—

In a structure of the class described, an automobile seat comprising a base, a cushion resting upon said base, said base being provided with a recess, a hingedly mounted back rest having an extension on its lower end projecting into said recess, a screw threaded socket carried by said back rest, a pocket in association with said socket, a substantially right angular retaining device including a horizontal arm and a depending leg, the horizontal arm having its free end disposed in such pocket, a keeper carried by the base portion of the seat, the lower end of the depending leg of said retaining device being removably received in said keeper, said leg being provided with an opening, a bolt passing through said opening and having its threaded end fitting into said socket and having a head on its outer end resting against said leg.

In testimony whereof I affix my signature.

FRANK BUNEVAC.